G. H. MAHAN.
HARROW ATTACHMENT FOR PLOWS.
APPLICATION FILED AUG. 18, 1909.
983,382.
Patented Feb. 7, 1911.
2 SHEETS—SHEET 1.
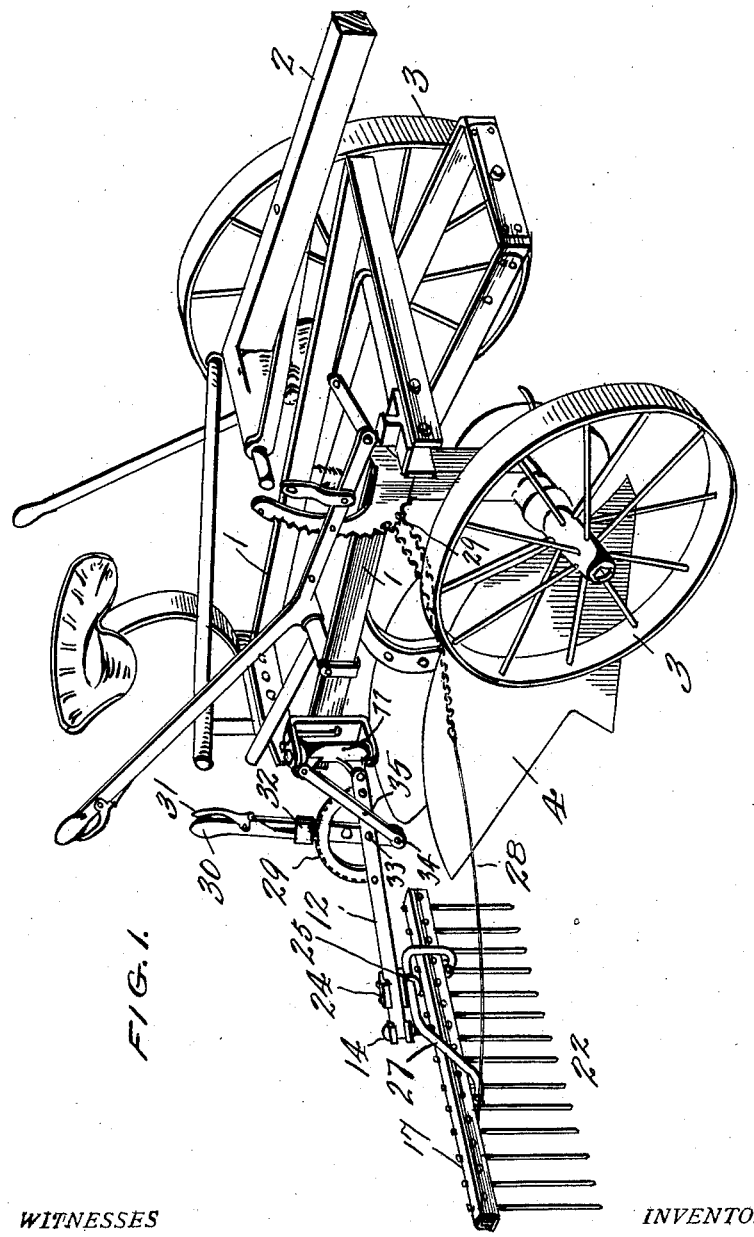
WITNESSES
C. K. Davies
D. Burdine
INVENTOR
George H. Mahan
By C. L. Parker
Attorney

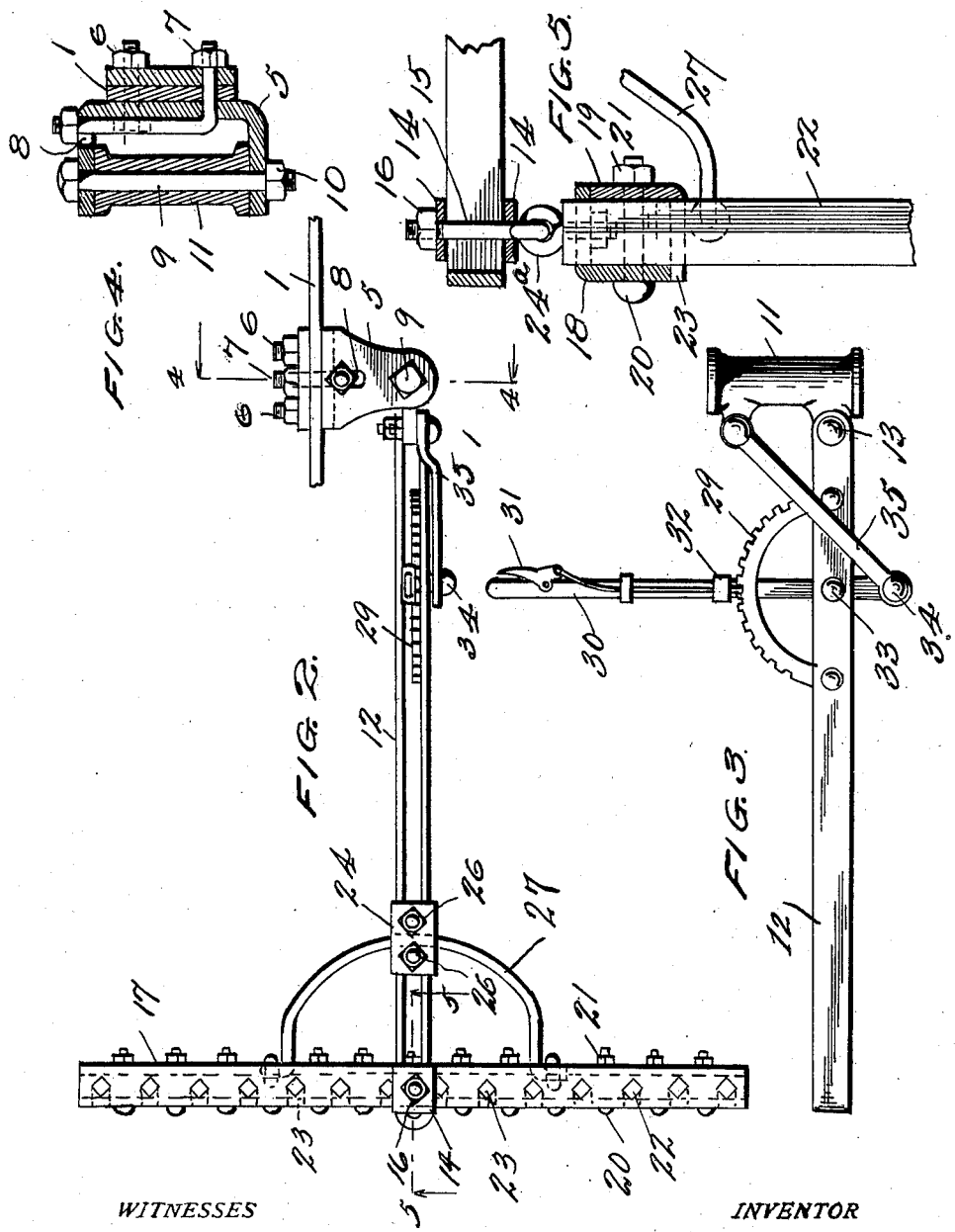

UNITED STATES PATENT OFFICE.

GEORGE H. MAHAN, OF SANDWICH, ILLINOIS.

HARROW ATTACHMENT FOR PLOWS.

983,382.  Specification of Letters Patent.  Patented Feb. 7, 1911.

Application filed August 18, 1909. Serial No. 513,447.

*To all whom it may concern:*

Be it known that I, GEORGE H. MAHAN, a citizen of the United States, residing at Sandwich, in the county of Dekalb and State of Illinois, have invented certain new and useful Improvements in Harrow Attachments for Plows, of which the following is a specification.

In the ordinary method of plowing and harrowing, the latter operation is frequently performed some time after the plowing has been finished, by which time the soil has become hardened, many clods having been baked by exposure to such a degree that much difficulty is experienced in harrowing.

My invention relates to that class of devices, which by attachment to any of the common forms of wheel-plows, permit of the plowing and harrowing operations being performed at the same time, the wheel-plow running as usual on the land-side and in the furrow and the harrow attachment being adapted to be applied to the freshly broken soil.

The objects of the present invention are to provide means whereby the harrowing operation under such circumstances may be thoroughly performed; to provide means whereby the harrow attachment may be maintained rearwardly of the wheel-plow frame or be adjusted laterally to any degree desired, or be elevated out of contact with the soil; and finally to provide means whereby the harrow teeth may be adjusted to any angle relatively to the frame connecting them to the frame of the machine, as well as means for tilting or angularly inclining the harrow teeth with reference to the soil.

The preferred embodiment of my invention is shown in the accompanying drawings, in which:—

Figure 1 is a perspective view of a wheel-plow provided with my improved form of harrow attachment. Fig. 2 is a top plan view of the harrow attachment. Fig. 3 is a side view of a portion of the structure shown in Fig. 2. Fig. 4 is a sectional view through the hinge and bracket connecting the harrow with the wheel-plow frame. Fig. 5 is a detail sectional view showing the connection between the harrow frame, and the frame connecting it with the wheel-plow frame.

Referring more particularly to the drawings, 1 indicates the frame of a common form of wheel-plow, 2 the tongue of same, 3 the wheels, and 4 the plows. At a suitable point on the frame 1 of the wheel-plow, and preferably at the rearward portion thereof, I attach a bracket 5 to the said frame, by means of ordinary bolts 6, and an angle bolt 7 the latter working in a slot 8 in the said bracket. The bracket 5 preferably consists, as will be seen upon reference to Fig. 4, of a plate so bent that an upper and a lower portion are formed in substantially parallel planes each to the other. A suitable pin 9, which may be an ordinary bolt, extends through the upper and lower sides of the bracket 5, and is held fast by a nut 10. A sleeve 11 is mounted upon said pin 9, and is capable of rotation thereon. A frame 12 is pivotally connected to the sleeve 11 at a point 13, and is capable of oscillatory movement in a substantially vertical plane on said pivot point, but the frame is not capable of lateral movement to any extent with reference to the sleeve; the sleeve and frame are however, together capable of lateral movement by virtue of the sleeve being rotatably mounted on the pin 9. The frame 12 may be of any desired construction, but in the drawings, I have shown it as consisting of a single piece or bar of metal, bent upon itself so as to form two substantially parallel members spaced apart a suitable distance, a bolt passing through both members at pivot point 13. A suitable clamp 14 consisting of upper and lower plates which bind the frame 12, is placed on the frame 12 at or near its rear extremity. An eye-bolt 15 passes through the clamp, said eye-bolt being held fast by nut 16.

An important feature of my invention consists of the harrow-tooth-carrying frame 17. This frame consists as will be apparent upon particular reference to Fig. 5, of two angle plates, 18 and 19, each having its two sides situated at substantially right angles to each other, and being placed together, as indicated in the said figure, so as to form a box-like structure. Each of the angle plates is provided with any desired number of bolt holes through which pass the bolts 20 having nuts 21 for locking the angle plates together in the position shown. The angle plate 18 is provided with a plurality of apertures on its upper side, through which pass the harrow teeth 22, which are preferably square in cross section. The angle plate 19 is provided on its lower side with the slots 23, through which the harrow teeth 22 pass, as is shown in Fig. 5, and by dotted lines in Fig. 2. I find that the structure thus described including the said slots, admits of the parts being very readily assembled, so that the harrow teeth will be in alinement, and in regular arrangement. The harrow tooth carrying frame is connected to the frame 12 through the medium of the clamp 14 by an eye-bolt 24ª, which engages the eye-bolt 15 and is inserted in the angle plate 18 at any suitable point, all of which is clearly shown in Fig. 5. A universal connection is thus established between the member 12 and the harrow tooth carrying frame by which the latter may be tilted or inclined with reference to the frame 12 at any angle desired, or it may be moved in a horizontal plane with reference to the said frame so as to make an angle therewith other than 90°, which latter relative position is indicated in Fig. 2.

For the purpose of maintaining the harrow-tooth carrying frame in any of the angularly inclined positions above suggested, as well as for providing a bracing means between the frames 12 and 17, I provide a clamp 24, which may be adjusted to any position desired on the frame 12, and a U-shaped bolt 25, passing through the said clamp, and provided with nuts 26. A brace 27, which may be substantially semicircular in shape, may have its two ends fastened by any known means to the frame 17, and said brace passes through the bend of the U-shaped bolt 25, as will be apparent upon reference to Figs. 1 and 2. By forcing the U-shaped bolt 25 toward the clamp 24 and tightening the nuts 26, it will be caused to tightly bind the brace 27, and thus maintain the frame 17 at any angularly inclined position with respect to the frame 12 to which it may be set. When it is desired to tilt the frame 17 away from a substantially vertical plane with reference to member 12, the clamp 24 may be adjusted to a new position on the frame 12, if necessary, and then the brace 27 may be fastened in the manner above described.

The foregoing description of the various features of my invention will make it apparent that the frame 12 and the harrow-tooth carrying frame may, after the two frames are adjusted relatively to each other by the means described and maintained in such adjusted position, be together swung in a horizontal plane by virtue of the hinge connection formed by the sleeve 11, and pin 9, in bracket 5. To assist this movement, I provide a chain 28, which may be fastened at one end to the frame 17, and at its opposite end may be gathered through apertures 29, at a suitable point in the frame in the wheel-plow. The universal adjusting means described admits of the harrow attachment being maintained in a position directly rearwardly of the wheel-plow so that the soil newly plowed may be immediately harrowed, or the harrow attachment may be swung laterally to any position approaching one at right angles to the wheel-plow-frame, so that the soil plowed by a previous journey of the machine may be harrowed. For elevating the harrow attachment from the ground when desired, I provide, on the frame 12, a segmental rack 29, which may be of the ordinary form, and a lever 30, having latch 31, and detent 32 for engaging any selected tooth of the segmental rack. Lever 30 is pivoted to the frame 12 at 33, and is further pivotally connected at 34 to a link 35 connected to the sleeve 11. It will thus be seen that the frame 12 will be forced to be elevated or depressed as the lever 30 is moved in one direction or the other.

Having thus described my invention, what I claim is:—

1. In combination with a plow frame, a harrow attachment comprising a rotatable member, means for connecting said rotatable member with the plow frame, a carrying frame pivotally connected to said rotatable member, a segmental rack arranged on said carrying frame, a lever having a dog or detent pivoted on said carrying frame and engaging said segmental rack, a link connected to said lever and to said rotatable member, a harrow tooth carrying frame connected to said carrying frame and having harrow elements arranged therein, said harrow tooth carrying frame being capable of tilting and lateral inclination relatively to said carrying frame, and means for maintaining the two frames at the angular inclination desired, substantially as described.

2. In combination with a plow frame, a harrow attachment comprising a bracket, means for securing said bracket to the plow frame, a pin mounted in said bracket, a sleeve rotatable on said pin, a carrying frame pivotally connected to said sleeve, a segmental rack arranged on said carrying frame, a lever having a dog or detent pivoted on said carrying frame and engaging said segmental rack, a link connected with said lever and with said sleeve, a harrow tooth carrying frame connected with said carrying frame, a brace connected with said harrow tooth carrying frame, a clamp arranged on said carrying frame and having an adjustable connection with said brace, and harrow elements arranged in said harrow tooth carrying frame, substantially as described.

3. A harrow attachment comprising a carrying frame, a rack arranged on said frame, a lever pivoted on the frame and having means to engage the rack, a link connected to said lever, means pivotally and rotatably connecting the carrying frame and the lever to a plow frame, a harrow tooth frame movably connected to said carrying frame and provided with harrow elements, said harrow tooth frame capable of tilting and lateral inclination relative to the carrying frame, and means for maintaining the two frames at the inclination desired.

4. The combination with a plow frame of a harrow attachment comprising a carrying frame, a rack arranged on said frame, a lever pivoted on the frame and provided with means to engage said rack, a link connected to said lever, means pivotally and rotatably connecting the carrying frame and the link to said plow frame, a harrow tooth frame movably connected to said carrying frame, and provided with harrow elements, said harrow tooth frame capable of tilting and lateral inclination relative to the carrying frame, means for maintaining the two frames at the inclination desired, and additional means for connecting the harrow tooth frame to said plow frame.

5. The combination with a plow frame, of a member pivotally connected therewith to oscillate in a substantially horizontal plane, a carrying frame pivotally connected with said member to oscillate in a substantially vertical plane with relation to the same, a harrow tooth frame connected for support with said carrying frame, a lever pivoted intermediate its ends to said carrying frame, a link pivotally connected with said lever below the pivotal connection of the carrying frame with the plow frame and pivotally connected with said member above the said pivotal connection of said carrying frame, and means to hold said lever in adjustment at different positions.

6. The combination with a plow frame, of a carrying frame connected therewith, a harrow tooth frame having universal connection with said carrying frame, means connected with the harrow tooth frame, and means suitably mounted upon the carrying frame to be moved longitudinally thereof, said last named means being adapted to adjustably hold the first named means, whereby the harrow tooth frame may be swung in substantially horizontal and vertical planes.

7. The combination with a plow frame, of a carrying frame connected therewith, a harrow tooth frame having a universal connection with the carrying frame, a curved rod pivotally connected with the harrow tooth frame, means mounted upon the carrying frame and capable of being moved longitudinally thereof, means to clamp the first named means in adjustment at different positions upon said carrying frame, the first named means having engagement with the curved rod so that the latter may have longitudinal movement, and means to clamp said curved rod at different positions with relation to the first named means.

In testimony whereof I affix my signature in presence of two witnesses.

GEORGE H. MAHAN.

Witnesses:
J. B. CASTLE,
LEWIS ROGERS.